March 14, 1944.  A. R. THOMPSON  2,344,184
HEAT EXCHANGE APPARATUS
Filed April 21, 1941  3 Sheets-Sheet 2
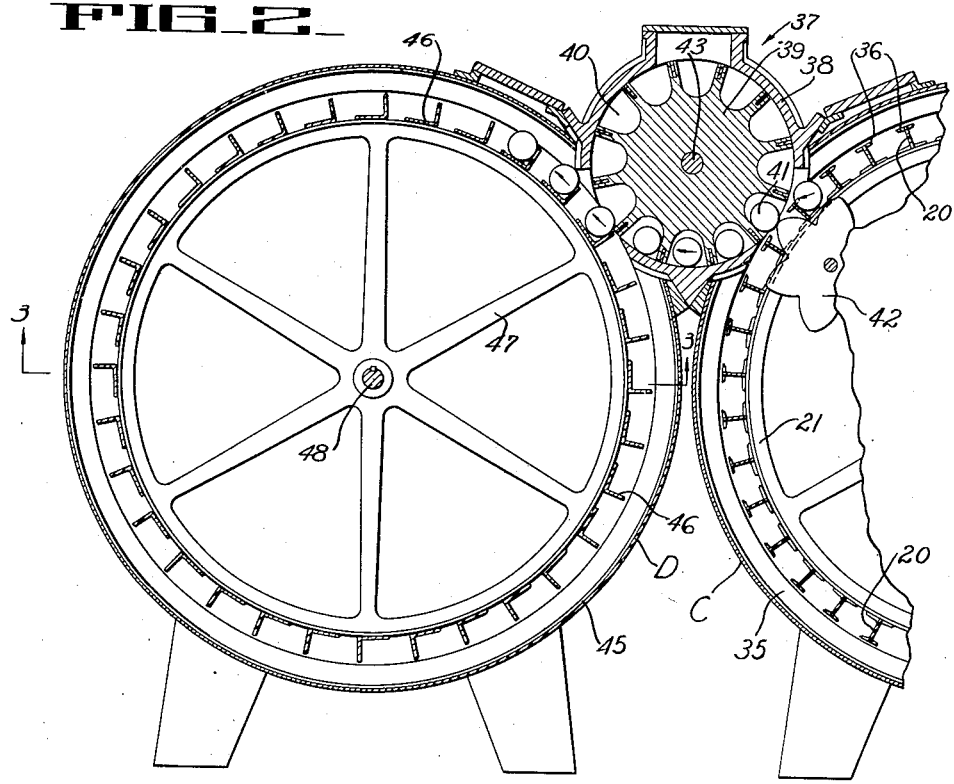
FIG_2_
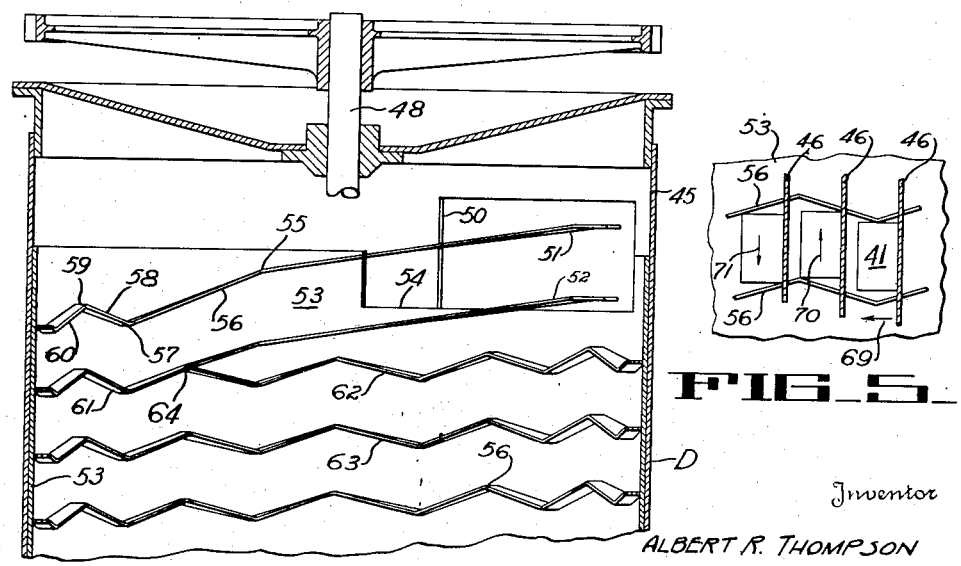
FIG_3_  FIG_5_
Inventor
ALBERT R. THOMPSON
By Philip A. Minnis
Attorney

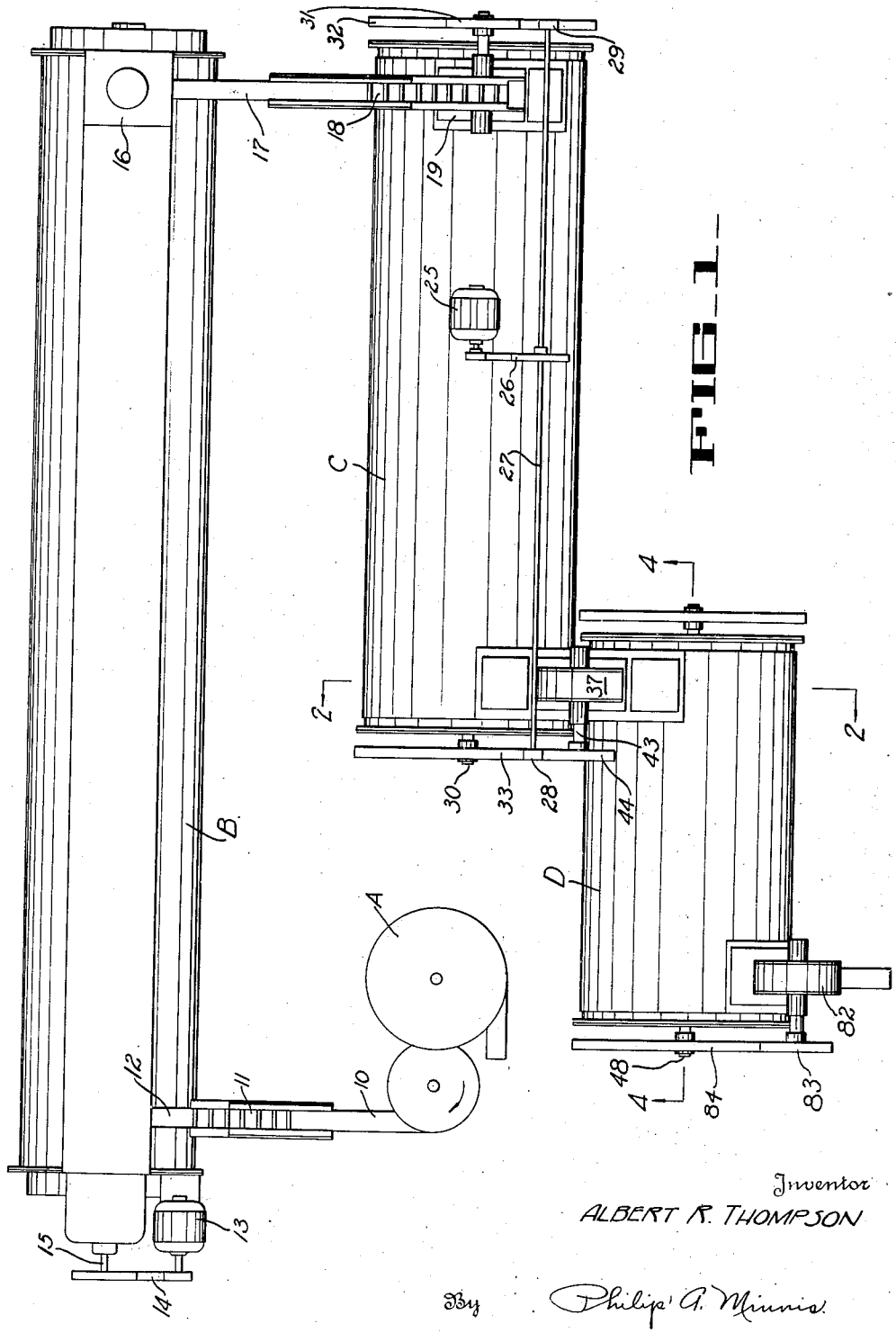

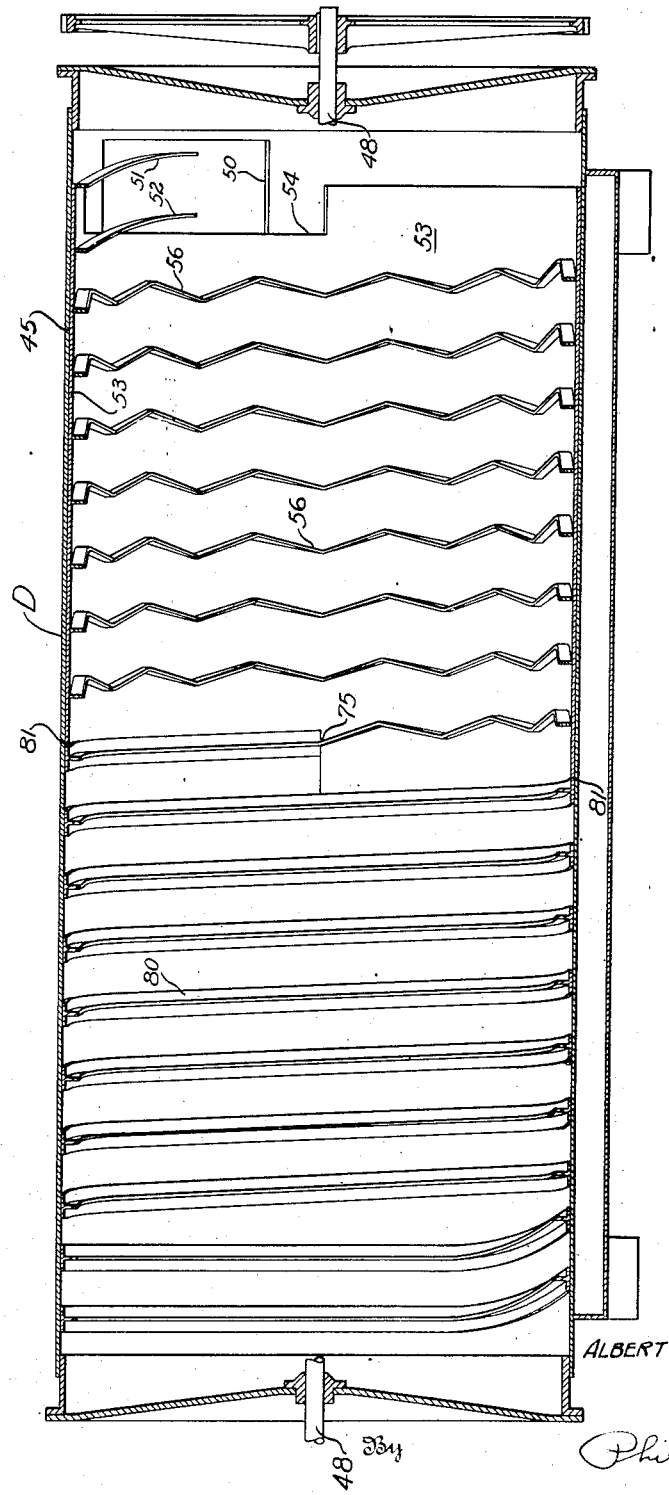

Patented Mar. 14, 1944

2,344,184

UNITED STATES PATENT OFFICE 2,344,184

HEAT EXCHANGE APPARATUS

Albert R. Thompson, Los Gatos, Calif., assignor to Food Machinery Corporation, San Jose, Calif., a corporation of Delaware Application April 21, 1941, Serial No. 389,551

10 Claims. (Cl. 99—365)

This invention relates to apparatus for treating canned goods.

One object of the invention is to provide a construction which may be employed to promote the transfer of heat to or from the contents of the cans during heating or cooling treatment.

Another object is to provide means for imparting extra agitation to the contents of the cans while the cans are traveling along a canway.

The invention is particularly applicable to apparatus employing a treating chamber having therein a rotary reel provided with longitudinal can channels along which the cans are led by a helical canway, and it is a further and more specific object of the invention to provide a canway construction in apparatus of this type which will cause the cans to be shaken endwise as they are carried around by the reel.

Other objects of the invention will appear after a disclosure of the apparatus in which the invention has been embodied.

While the invention may be employed in cookers and coolers for treating canned goods of any description it is particularly applicable to apparatus for treating canned liquids and will be herein disclosed as embodied in apparatus for sterilizing canned evaporated milk. The invention may be employed advantageously to increase the rate of heat transfer and to agitate the milk in any part of the apparatus, and while, for purposes of illustration, in this application it has been disclosed as embodied only in the cooler to increase the rate of cooling and to prevent the formation of skin on the milk, it could also be employed in the sterilizer, for example, to aid in carrying out a method of sterilization such as that disclosed in my co-pending application Serial No. 381,492, filed March 3, 1941.

In the drawings:

Fig. 1 is a diagram showing in plan the arrangement of the several units of an apparatus for sterilizing canned evaporated milk.

Fig. 2 is a transverse section through the sterilizer and cooler as indicated by the line 2—2 in Fig. 1.

Fig. 3 is a partial horizontal section through the cooler taken as indicated by the line 3—3 in Fig. 2. In reading this figure it is to be borne in mind that the view is taken looking upward.

Fig. 4 is a vertical longitudinal section through the cooler taken as indicated by the line 4—4 in Fig. 1.

Fig. 5 is a fragmentary development of the canway to illustrate diagrammatically the manner in which the cans are shaken back and forth as they traverse the same.

Referring to Fig. 1, the general arrangement and operation of the entire apparatus will be described only briefly, as apparatus of this general type is well known, being disclosed, for example, in Patent No. 1,499,038, issued to me June 24, 1927. The cans are filled with the evaporated milk and hermetically sealed in the filling and soldering machine indicated at A (Fig. 1). The filled cans are discharged into a chute 10 from which they are carried by means of an elevator 11 and deposited in a rotary valve 12 which introduces the cans into the longitudinal channels on the reel (not shown) of a preheater B. A motor 13 through suitable gearing 14 rotates the reel shaft 15 continuously. The cans are advanced along the channels on the reel by means of a canway of conventional construction (not shown) which leads the cans in continuous procession to a discharge valve 16. During the travel of the cans through the preheater B the milk is heated up to about 210° F. and is preconditioned for the sterilizing treatment which it is to receive in the sterilizer C.

The cans discharged from the preheater B are received in a transfer chute 17 and are raised by an elevator 18 to a rotary steam-tight valve 19 which introduces the cans between the rails 20 (Fig. 2) of the sterilizer reel 21. The motor 25 (Fig. 1) through suitable gearing 26 drives a shaft 27 which is connected at each end through suitable gearing 28, 29 with the shaft 30 which carries the reel 21 (Fig. 2). The valve 19 is driven in synchronism with the reel and sterilizer by means of a gear 31 which engages the gear 32 on the reel shaft 30. Secured to the interior of the cylindrical shell of the sterilizer C is a helically-trending canway 35 (Fig. 2) which engages the ends of the cans and shifts them along the can channels formed between the rails 20 of the reel. These rails are provided with flanges 36 which prevent the cans from rolling on the canway 35, this being what is known as a non-agitating reel. The canway 35 being of conventional construction is not shown in detail. As the reel 21 rotates, the cans are carried around the shell and are advanced along the canway to the transfer valve 37 (Figs. 1 and 2). Upon arrival at this point the milk in the cans has been completely sterilized and the cans are now to be transferred to a cooling chamber.

The transfer valve 37, which may be of a construction similar to that disclosed in my Patent No. 1,467,960, issued September 11, 1923, comprises a casing 38 within which a valve body 39 rotates. Pockets 40 are formed in the periphery of the valve body 39 for receiving the cans 41 ejected from the reel 21 of the sterilizer by the star wheel 42. The valve body 39 is mounted on a shaft 43 having thereon a gear 44 (Fig. 1), which is driven from the sterilizer reel gear 33, so that the valve and reel rotate in synchronism. The valve 37 transfers the cans 41 to the interior of the shell 45 of the cooler D where they lodge between the rails 46 which are secured to the reel 47 which is rotated by means of the shaft 48. This reel may be of conventional construction, the rails 46 being angles and extending longitudinally of the reel parallel to the reel shaft 48. The canway which cooperates with this reel is, however, of novel construction and will now be described.

Referring to Figs. 3 and 4, the inlet opening in the cooler shell 45 through which the cans are introduced by the valve 37 is shown at 50. Disposed adjacent this inlet is the beginning of the cooler canway which comprises two parallel rails 51, 52 formed from flat strips of metal which are secured to a cylindrical inner shell 53 rigidly attached to the shell 45. The inner shell 53 is cut away at 54 so as not to obstruct the inlet opening 50. The two rails 51, 52 are spaced apart a sufficient distance to admit a can therebetween and are curved to lead the cans away from the inlet 50. At the point 55 (Fig. 3) the rail 51 joins the rail 56 of a zig-zag canway.

The rail 56 is formed into zig-pag shape by bending a flat strip of metal at equal spaced points in alternate directions. After it has been formed in this manner it is welded to the inner cylindrical shell 53 so that its general course is in the form of a helix. Thus, for example, the rail 56 is bent at point 57 so that the portion 58 is angularly disposed in one direction with respect to the general course of the rail; at 59 it is again bent so that the portion 60 is angularly disposed in the opposite direction; and so on. The rail 56 is so proportioned and arranged that adjacent turns provide the side walls of a zig-zag pathway or canway. For this purpose portions of the rail in successive turns which are opposite each other longitudinally of the shell are disposed in parallelism. For example, the portion 58 in the first turn is parallel to the portion 61 in the second turn; the portion 62 in the second turn is parallel to the portion 63 in the third turn; and so on. The other lead-in rail 52 joins the zig-zag rail 56 in the second turn thereof at the point 64.

Referring to Fig. 5, which is a fragmentary development of the zig-zag canway 56 showing diagrammatically the pusher rails 46 of the reel and the cans 41, it will be apparent that upon rotation of the reel as the rails 46 push the cans along the zig-zag canway in the direction of the arrow 69 the cans 41 will be moved endwise first in one direction and then in the other, as indicated by the arrows 70, 71. In other words, each can is reciprocated axially as it is pushed along the zig-zag canway. This reciprocation or shaking of the can imparts the desired extra agitation to the milk.

In the apparatus chosen for illustration it is desirable to cool the milk as rapidly as possible when it first enters the cooler in order to check the heat treatment, and it is also important to prevent the formation of skin on the milk while it is cooling. Accordingly, the zig-zag canway 56 (Fig. 4) extends for several turns through substantially the first half of the cooler, so that the milk receives maximum agitation during the first part of the cooling treatment. It is undesirable, however, in treating milk, to continue this agitation any longer than necessary. Therefore, at the point 78 (Fig. 4) the zig-zag conformation of the canway is discontinued and the ordinary helical form is employed throughout the remainder of the cooler.

If, in other applications of this invention, it should be desirable to continue the agitation over a longer period of time, the zig-zag construction of the canway may be extended as far as necessary, even to the full length of the chamber.

The latter portion 80 of the canway is constructed of a rail of T-section which is attached directly to the shell 45 of the cooler, the inner shell 53 to which the zig-zag rail 56 is welded terminating at 81. During the travel of the cans through the latter portion 80 of the cooler canway the milk receives only a moderate amount of agitation which results from the can turning with the reel and rotating on the canway. Upon arrival at the end of the canway the cans are removed from the reel and discharged by the valve 82 (Fig. 1) which is driven by a gear 83 from the gear 84 on the cooler reel shaft 48.

It will be apparent that I have provided a simple and efficient means for imparting a shaking movement to the cans which does not involve the use of any moving parts over and above those ordinarily employed in apparatus of this type, and is consequently dependable in operation.

While I have disclosed my invention as applied to the cooler of an apparatus for sterilizing evaporated milk in cans, it will be understood that not only could this same construction be employed to advantage in other parts of the apparatus, as, for example, in the sterilizer, but could also be used to advantage in apparatus of this general construction when employed for heat treating other canned products.

Having thus described my invention and in what manner the same may be used, what I claim as new and desire to protect by U. S. Letters Patent is:

1. In apparatus for treating canned goods, a heat exchange chamber, a spirally trending canway to guide the cans through said chamber, and means in said chamber movable with respect to said canway to engage and advance the cans along said canway, said spirally trending canway having laterally undulated opposite walls whereby the cans are reciprocated by said walls as they are advanced along said canway by said movable means.

2. In apparatus for treating canned goods, a heat exchange chamber, a canway to guide the cans through said chamber, and means movable with respect to said canway to advance the cans along said canway, said canway forming a zig-zag pathway which causes the cans to be moved axially back and forth as they are advanced along said canway.

3. In apparatus for treating canned goods, a heat exchange chamber, a stationary helically-trending canway in said chamber, and a rotary reel having longitudinal can channels thereon disposed in cooperative relationship with said canway so that the ends of cans disposed in said channels are engaged by portions of said canway, said portions having an uneven conformation to cause reciprocation of the cans in said channels as said reel rotates.

4. In apparatus for treating canned goods, a heat exchange chamber, a stationary helically-trending canway in said chamber formed to provide a zig-zag path for the cans, and a rotary reel having means to confine the cans to travel in said path and to advance the cans along said canway, whereby the cans are axially reciprocated as they follow said canway to cause agitation of the contents.

5. In apparatus for treating canned goods, a heat exchange chamber, a stationary helically-trending canway in said chamber, part of said canway being formed by means of a rail of zig-zag conformation coiled in a helix and a rotary reel having means to confine the cans to travel in said canway and to advance the cans along said canway, whereby the cans receive extra agitation during the time they are traversing said zig-zag part of said canway.

6. In apparatus for treating canned goods, a heat exchange chamber having an inlet and an outlet, a stationary helically-trending canway for guiding the cans from said inlet to said outlet, and a rotary reel having means for advancing the cans along said canway, a part of the canway adjacent said inlet being formed by guiding means of undulated conformation to move the cans back and forth transversely of the helical trend of said canway to impart extra agitation to the contents of the cans during the time they are traversing said part of said canway.

7. In apparatus for treating canned goods, a heat exchange chamber having an inlet and an outlet, a stationary helically-trending canway leading from said inlet to said outlet, a rotary reel having means for advancing cans along said canway, the end of said canway opposite said inlet being formed of a pair of rails curved to move the cans away from said inlet, said pair of rails being joined to a single rail of zig-zag conformation coiled in a helix, one of said pair of rails joining said zig-zag rail at the beginning thereof, and the other of said pair of rails joining said zig-zag rail at a point disposed substantially one turn of the helix from the beginning thereof.

8. In apparatus for handling canned goods, a stationary spirally trending canway to guide the cans from one point to another, movable means for advancing the cans along said canway, said canway having two side walls for engaging the ends of the cans, said side walls being formed to provide a laterally undulated pathway between them whereby the cans will be agitated endwise by said walls as they are advanced along said canway by said movable means.

9. In apparatus for handling canned goods, a stationary canway to guide the cans from one point to another, movable means for advancing the cans along said canway, said canway having two side walls for engaging the ends of the cans, each of said walls having a zig-zag conformation, said two walls being arranged with corresponding portions parallel, whereby cans advanced along said canway by said movable means are simultaneously reciprocated axially by said walls to agitate the contents.

10. In apparatus for treating packaged goods, a tortuous packageway to guide the packages, and means movable with respect to said packageway to engage and advance the packages along said packageway, said packageway having walls of undulated conformation for engaging and reciprocating the packages as they are advanced along said packageway by said package engaging means.

ALBERT R. THOMPSON.